US007173910B2

(12) United States Patent
Goodman

(10) Patent No.: US 7,173,910 B2
(45) Date of Patent: Feb. 6, 2007

(54) SERVICE LEVEL AGREEMENTS BASED ON OBJECTIVE VOICE QUALITY TESTING FOR VOICE OVER IP (VOIP) NETWORKS

(75) Inventor: Lee Goodman, Lowell, MA (US)

(73) Assignee: Level 3 Communications, Inc., Broomfield, CO (US)

(*) Notice: Subject to any disclaimer, the term of this patent is extended or adjusted under 35 U.S.C. 154(b) by 828 days.

(21) Appl. No.: 09/855,103

(22) Filed: May 14, 2001

(65) Prior Publication Data
US 2002/0167936 A1 Nov. 14, 2002

(51) Int. Cl.
H04L 12/26 (2006.01)
H04L 12/66 (2006.01)
H04L 12/28 (2006.01)

(52) U.S. Cl. .............. 370/252; 370/356; 370/395.43

(58) Field of Classification Search ............ 370/352, 370/354, 400, 401, 467, 468, 470, 235, 236, 370/252, 465, 353, 351, 229, 210, 230.1, 370/395.21, 395.52; 379/242, 243, 32.01, 379/88.17, 88.2; 709/223
See application file for complete search history.

(56) References Cited

U.S. PATENT DOCUMENTS

| 5,867,813 | A | * | 2/1999 | Di Pietro et al. ........... 704/202 |
| 5,961,599 | A | * | 10/1999 | Kalavade et al. ........... 709/224 |
| 6,259,691 | B1 | | 7/2001 | Naudus |
| 6,275,797 | B1 | | 8/2001 | Randic |
| 6,363,053 | B1 | * | 3/2002 | Schuster et al. ............ 370/230 |
| 6,370,120 | B1 | | 4/2002 | Hardy |
| 6,404,764 | B1 | | 6/2002 | Jones et al. |
| 6,437,229 | B1 | | 8/2002 | Nobumoto |
| 6,477,492 | B1 | | 11/2002 | Connor |
| 6,512,746 | B1 | * | 1/2003 | Sand .......................... 370/252 |
| 6,570,969 | B1 | | 5/2003 | Albal et al. |
| 6,600,740 | B1 | * | 7/2003 | Valentine et al. ........... 370/365 |
| 6,603,774 | B1 | * | 8/2003 | Knappe et al. ............. 370/466 |
| 6,633,582 | B1 | * | 10/2003 | Panburana et al. ......... 370/465 |
| 6,665,271 | B1 | * | 12/2003 | Thomas et al. ............. 370/252 |
| 6,700,953 | B1 | | 3/2004 | Maurer et al. |
| 6,707,827 | B1 | | 3/2004 | Shaffer et al. |
| 6,718,296 | B1 | | 4/2004 | Reynolds et al. |

(Continued)

FOREIGN PATENT DOCUMENTS

WO WO 00/72453 11/2000

OTHER PUBLICATIONS

Documentation, *Omni-Q Voice Quality Management System*, Revision A, RADCOM, Jan. 2001.

(Continued)

Primary Examiner—Chi Pham
Assistant Examiner—Melanie Jagannathan
(74) Attorney, Agent, or Firm—Faegre & Benson LLP

(57) ABSTRACT

An objective, service-level specific voice call listening quality test scheme for a Voice Over IP (VOIP) network is presented. Test probes are deployed along the border of the VOIP network. Each test probe is capable of placing calls over the VOIP network to the other test probes at different levels of service and measuring call quality using an objective measurement algorithm such as PAMS or PSQM. The measurement results are collected on an ongoing basis to obtain information on the VOIP network's voice call quality. The information is compared to thresholds to measure performance against Service Level Agreement guarantees.

19 Claims, 6 Drawing Sheets

U.S. PATENT DOCUMENTS

| | | | |
|---|---|---|---|
| 6,721,541 B1 | 4/2004 | Kingsley | |
| 6,735,175 B1* | 5/2004 | Havens | 370/236 |
| 6,738,353 B2* | 5/2004 | Chong | 370/241 |
| 6,741,569 B1* | 5/2004 | Clark | 370/252 |
| 6,748,433 B1* | 6/2004 | Yaakov | 709/224 |
| 6,754,232 B1* | 6/2004 | Tasker | 370/477 |
| 6,778,496 B1 | 8/2004 | Meempat et al. | |
| 6,834,040 B2 | 12/2004 | Tomberlin | |
| 6,862,298 B1 | 3/2005 | Smith et al. | |
| 6,876,647 B2 | 4/2005 | Celi, Jr. | |
| 6,940,820 B2 | 9/2005 | Fang | |
| 2002/0143979 A1 | 10/2002 | Douceur et al. | |
| 2002/0167936 A1 | 11/2002 | Goodman | |
| 2003/0009306 A1 | 1/2003 | Fang | |

OTHER PUBLICATIONS

Spirent Communications: "Voice over IP (VoIP) Testing Methodology and Case Studies", Spirentcom White Paper, 'Online! Feb. 2001.

Reynolds, P J B et al. "Quality VoIP—an engineering challenge", BT Technology Journal, BT Laboratories, GB, vol. 19, No. 2, Apr. 1, 2001.

Cole, R G et al. "Voice Over IP Performance Monitoring", Computer Communications Review, Association for Computing Machinery, New York, US, vol. 31, No. 2, Apr. 2001.

Author Unknown; "OmniQ Voice Quality Management System"; 12 pp; BRO-OMNIQ. Revision A; Radcom, 2001.

Conway, A.E., "A Passive Method for Monitoring Voice-Over-IP Call Quality with ITU-T Objective Speech Quality Measurment Methods", Apr. 28 - May 2, 2002; Communications, 2002; ICC 2002, IEEE International Conference, vol. 4 pp. 2583-2586.

DE, B.S. et al., "End-to-end Voice Over IP Testing and the Effect of QoS on Signaling"; Mar. 16-18, 2003; System Theory, 2003; Proceedings of the 35$^{th}$ Southeastern Symposium; pp. 142-147.

Rix, A.W. et al.; "The Perceptual Analysis Measurment System for Robust End-to-End Speech Quality Assessment"; Jun. 5-9, 2000; Acoustics; Speech and Signal Processing, 2000; ICASSP 00; Proceedings; 2000 IEEE International Conference, pp. 1-4; vol. 3.

Rix, A.W. et al; "Perceptual Evaluation of Speech Quality (PESQ) A New Method for Speech Quality Assessment of Telephone Networks and Codecs"; May 7-11, 2001; Acoustics, Speech and Signal Processing, 2001; Proceedings; 2001 IEEE International Conference, vol. 2, pp. 749-752.

* cited by examiner

SERVICE LEVEL AGREEMENTS BASED ON OBJECTIVE VOICE QUALITY TESTING FOR VOICE OVER IP (VOIP) NETWORKS

BACKGROUND OF THE INVENTION

The invention relates to voice call quality testing.

Packet-based networks, in particular, Voice Over IP (VOIP) networks, are rapidly emerging as a viable alternative to traditional telephony (that is, circuit switched networks). VOIP is viewed as an attractive option for voice transport in that it allows live voice conversations to be integrated with existing IP data and image applications. To be a truly competitive alternative, VOIP must emulate the performance of traditional telephony and do so using a protocol that was optimized for data traffic. The characteristics of data traffic are quite different from those of voice traffic, however.

Unlike data traffic, voice traffic is extremely intolerant of delay and delay variation (or "jitter"), as well as packet loss. Much work has been done in the area of packet delivery to provide end-to-end Quality of Service (QoS). Service level agreements (SLAs) for VOIP, like those for conventional data IP networks, therefore tend to be based on conventional data network metrics, that is, guaranteed service levels are expressed solely in terms of packet level performance, e.g., packet loss, delay, jitter.

Another important aspect of voice communications quality that is not reflected in the data network metrics, however, relates to the sound of a voice call from the perspective of the listener. Standardized techniques exist for measuring this aspect of voice quality. Typically, to support voice communications, VOIP networks encode the audio and format the encoded audio into packets for transport using an IP protocol. Consequently, the results of these voice quality tests are greatly affected by choice of speech coding techniques.

One approach utilizes a standardized ranking system called the Mean Opinion Score (MOS). The MOS system uses a five-point scale: excellent-5; good-4; fair-3; poor-2; and bad-1. A level of quality indicated by a score of 4 is considered to be comparable to "toll quality". A number of people listen to a selection of voice samples or participate in conversations, with the speech being coded by using the technique to be evaluated. They rank each of the samples or conversations according to the five-point scale and a mean score is calculated to give the MOS. Although the applicable ITU standard, ITU-T P.800, makes a number of recommendations regarding the selection of participants, the test environment, explanations to listeners, analysis of results, etc., because this type of voice quality testing is subjective, results tend to vary from test to test.

Algorithms for performing a more objective voice quality test have been developed as well. These objective techniques for testing voice transmissions in packet-based networks include an ITU standard based algorithm known as Perceptual Speech Quality Measurement (PSQM) and Perceptual Analysis Measurement System (PAMS), which was developed by British Telecom. Both of these perceptual test algorithms evaluate whether a particular voice transmission is distorted from the perspective of a human listener.

PSQM takes a "clean" voice sample and compares it to a potentially distorted version, that is, a transmitted version, using a complex weighting that takes into account what is perceptually important to a human listener, for example, the physiology of the human ear and cognitive factors related to what human listeners are likely to notice. PSQM provides a relative score (on a scale of 1 to 15, with 1 corresponding to the highest score and 15 corresponding to the lowest score) that indicates how different the distorted signal is with respect to the reference from the perspective of the human listener.

PAMS is based on a perceptual model similar to that of PSQM and shares with PSQM the purpose of providing a repeatable, objective means for measuring voice quality, but uses a different signal processing model than PSQM and produces a different type of score as well. The scoring provided by PAMS includes a "listening quality" score and a "listening effort" score, both of which correlate to the MOS scores and are on the same scale of 1 to 5.

SUMMARY OF THE INVENTION

In one aspect of the invention, providing service for use in a Voice Over Internet Protocol (VOIP) network environment includes selecting a service level and measuring voice call listening quality according to the selected service level for voice calls transmitted across a VOIP network to produce voice call listening quality metric values.

In another aspect of the invention, a computer program product residing on a computer readable medium for providing service for use in a Voice Over Internet Protocol (VOIP) network environment comprises instructions for causing a computer to: associate service levels with phone numbers; and, in response to a test voice call directed to one of the phone numbers, cause the test voice call to be transferred over the VOIP network to a destination corresponding to such phone number at the associated service level and causing a voice call listening quality to be measured for the associated service level to produce a voice call listening quality metric value.

Particular implementations of the invention may provide one or more of the following advantages. The invention allows a network operator or service provider to provide a customer with an SLA that is based on voice call quality metrics, in particular, voice call listening quality metrics (such as MOS rankings), which reflect voice call quality as perceived by a human listener, as well as packet-based metrics. The voice quality tests are objective, repeatable tests and can therefore be implemented in an automated, production environment to enforce SLAs. The invention also enables the voice call listening quality metrics to be obtained for different service levels according to coding scheme and/or protocol.

Other features and advantages of the invention will be apparent from the following detailed description and from the claims.

DETAILED DESCRIPTION

Figure 1:
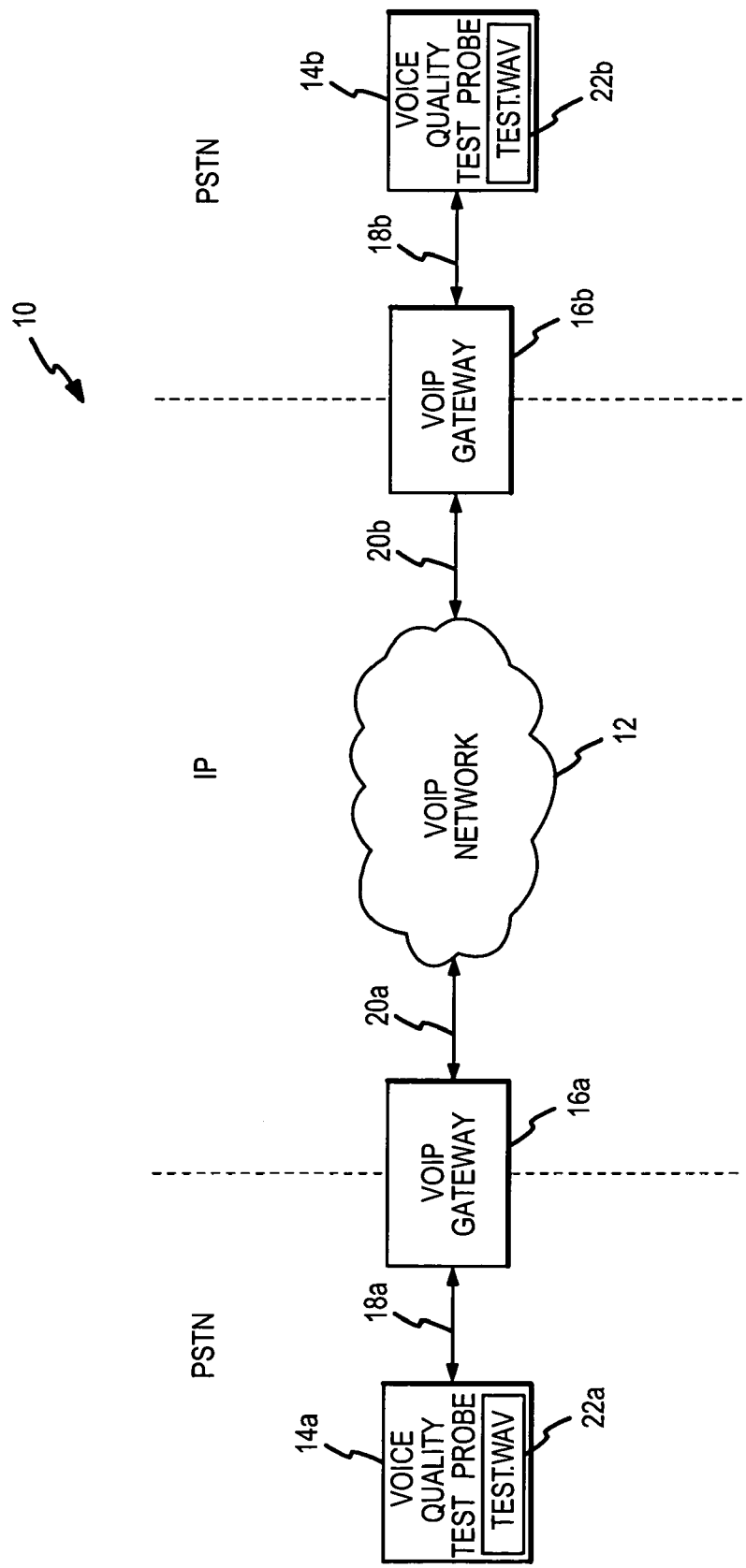
FIG. 1 is a block diagram illustrating a Voice Over IP (VOIP) network voice call listening quality test topology.

Referring to FIG. 1, an exemplary voice quality network test topology 10 includes a packet-based network shown as an IP network 12 that transports voice traffic. The network test topology 10 further includes voice quality test probes 14a and 14b, which are coupled to gateways 16a and 16b, respectively. The gateways 16a and 16b each are connected to the IP network 12 and provide translation services between protocols of the IP network and a conventional telephony network, such as a Public Switched Telephone Network (or "PSTN"). The test probe 14a is connected to the gateway 16a by a first telephony transmission line, shown as an ISDN line 18a (e.g., E1 or T1), and uses an ISDN Primary Rate Interface (PRI) service. The test probe 14b is connected to the gateway 16b over a second telephony transmission line 18b, also shown as an ISDN line 20b supporting ISDN-PRI service. Other PSTN physical and signaling interfaces can be used. For example, the lines 20a, 20b may be ISDN-BRI or CAS T1/E1 lines. Alternatively, the lines can be implemented as analog FXO wires. Because the IP network 12 transports voice traffic, it is also referred to as a Voice Over IP (VOIP) network and IP communication devices coupled to the VOIP network 12 either directly (such as the gateways 16a, 16b) or indirectly (through another IP communications device) are also referred to as VOIP communications devices.

The test probes 14a, 14b store a sample or reference voice file 22a, 22b, respectively, for test purposes. The reference voice file 22 is formatted as a typical audio file, e.g., RIFF WAVE "*.WAV" file (as shown), or some other audio format. The test probes 14a, 14b also store a software algorithm implementing a perceptual or voice call listening quality test model. In one embodiment, the software algorithm is the Perceptual Analysis Measurement System (PAMS) algorithm. Other objective, repeatable voice call listening quality test algorithms, e.g., Perceptual Speech Quality Measurement (PQMS), can also be used. Although one of the two test scores produced by PAMS is known as "listening quality", the term "voice call listening quality" as used herein refers to the quality measured by any perceptual voice call test technique, such as PAMS (and therefore encompasses both the PAMS "listening quality" as well as the PAMS "listening" effort") or PQMS. The test probes 14a, 14b can store any type of reference voice file, but the voice file stored on both of the test probes 14 as the reference voice file must be identical in order for the PAMS (or other similar) voice call listening quality testing to work correctly. Preferably, for optimum test results, the voice file should include voice samples representative of many different types of voice activity.

In operation, the test probes 14 transmit and receive the reference voice files (test.WAV files 22a, 22b) over the speech path within the VOIP network. One test probe acts as a resource to transmit the file. A second test probe acts as a resource to receive the file transmitted by the first test probe and perform the PAMS algorithm. For example, the test probe 14a, serving as a "call initiator", dials a telephone number corresponding to the other test probe, the test probe 14b (acting as a "call responder"). The VOIP gateway 16a directs the call over the VOIP network 12 to the VOIP gateway 16b, which sends the call to the test probe 14b. The test probe 14b answers the call by playing back to the caller, that is, test probe 14a, the stored reference voice file. The test probe 14a records the played voice file as it "listens" and analyzes the voice quality of the recorded voice file using the PAMS algorithm. The PAMS algorithm compares the recorded voice file to the reference voice file stored by the test probe 14a and determines a difference between the files. When the analysis is complete, the test probe 14a translates the difference into a PAMS score (actually, a two-part score having separate scores for listening quality and listening effort) for the voice quality of the call. It will be understood that the same process can be used in the reverse direction, that is, when the test probe 14b acts as the call initiator and the test probe 14a acts as the call responder. The test probes 14 may be configured to allow a test administrator to view the resulting scores graphically or in some other form.

Preferably, the voice call listening quality test is performed for each level of service as determined by the type of codec (i.e., coder/decoder) that is used by the VOIP communications device that is performing the voice encoding and decoding operations. In the network shown in FIG. 1, the gateways 16 implement one or more coding schemes to support voice encoding/decoding.

Types of codecs include, but need not be limited to, the following: waveform codecs, source codecs and hybrid codecs. With waveform codecs, an incoming voice signal is sampled, coded and the coded samples converted to quantized values, which are used to reconstruct the original voice signal. Waveform codecs produce high quality sound but consume a significant amount of bandwidth. Source codecs try to match an incoming voice signal to a mathematical model of speech generation. That model is used to reconstruct the original voice signal. The source codec operates at low bit rates but tends to produce poor quality sound. Hybrid codecs use some amount of waveform matching as well as knowledge of how the original sound was generated. They tend to provide fairly good quality at lower bit rates than waveform codecs.

The G.711 Pulse-Code Modulation (PCM) coding technique is a waveform codec and is one of the most common coding techniques that are used. It is the codec of choice for circuit-switched telephone networks. Other PCM waveform codecs include G.726, which offers Adaptive Differential PCM (ADPCM) coded speech. Lower bandwidth, hybrid codecs include the G.723 and G.729 codecs.

The choice of codec is a major factor in high voice quality and voice quality test scores will vary with codec selection. The goal of any network operator or service provider is to offer "toll quality" voice, where toll quality voice relates to a MOS of 4.0 or better. The task of selecting the best codec for a given network is a matter of balancing quality with bandwidth consumption. Thus, it is desirable to test different codecs in an environment that closely matches expected network conditions.

Still referring to FIG. 1, the test topology 12 tests for three different coding techniques, G.711, G.723 and G.729, although other coding schemes can be used in addition to, or lieu of, any one or more of these techniques. That is, each of the gateways 16 is capable of encoding and decoding in accordance with these different coding techniques. Consequently, there is a different phone number for each test probe and service level combination.

Optionally, in addition to measuring voice call quality on a per-codec basis, test probes 14 can test voice call quality on a per-protocol basis as well. That is, it is possible to further associate each test probe phone number and service level combination with each protocol supported by the VOIP communications devices 16. For example, commercially available gateways support such signaling protocols as H.323 and Session Initiation Protocol (SIP), as well as Media Gateway Control Protocol (MGCP). Other existing protocols, such as media gateway control protocol (MEGACO/H.248), as well as other protocols, may be supported as well. The protocol-specific testing could measure, for example, voice call setup and tear-down times.

For example, to illustrate service level selection based on both codec and IP signaling protocol, each of the test probes 14 may be assigned four unique telephone numbers. The four unique phone numbers include: a first unique phone for a service level associated with the use of G.711 coding and H.323 signaling; a second unique phone for a service level associated with the use of G.723 coding and H.323 signaling; and third unique phone number for a service level associated with the use of G.711 coding and SIP signaling; and a fourth unique phone number for a service level associated with the use of G.723 coding and SIP signaling. To place a call to the test probe 14b, the test probe 14a initiates a call to one of the four unique phone numbers for the test probe 14b with the gateway 16a. Gateway 16a is configured with resources to perform both types of coding and signaling, but selects the appropriate coding for the call to the test probe 14b and call signaling to establish a connection with the gateway 16b based on the phone number. Typically, the gateways include a configuration table which stores the called phone numbers with associated service level information for look-up, as will be described in further detail below. Thus, the gateway 16a determines from the service level information associated with the called phone number (for test probe 14b) how the audio is to be encoded and how the data connection is to be established. When the connection between gateway 16a and 16b is established, the gateway 16b is able to detect the type of coding in use and allocate an appropriate coding resource to encode the audio when it is receives the voice file transmission from the test probe 14b.

Although not shown, it will be understood that the test probes 14 further include the necessary hardware and software required to support applicable network layer protocols. In addition, and specifically in support of voice call quality testing, each test probe 14 includes a call generator. In one embodiment, the call generator provides a complete H.323 implementation package that is capable of initiating and responding to calls. The package thus simulates an H.323 terminal generating calls with (or without) a VOIP gateway, as well as opening logical channels and transmitting RTP voice packets. Other VOIP protocols, such as SIP and MGCP (as discussed above), can be used instead of or in addition to H.323.

As indicated above, the test probes 14 are configured to perform automated voice quality measurements on a voice transmission and produce a score based on those measurements. This testing may be performed in a laboratory environment to simulate conditions of an operating network, or as part of the actual network operation, as will be described with reference to FIG. 2.

Figure 2:
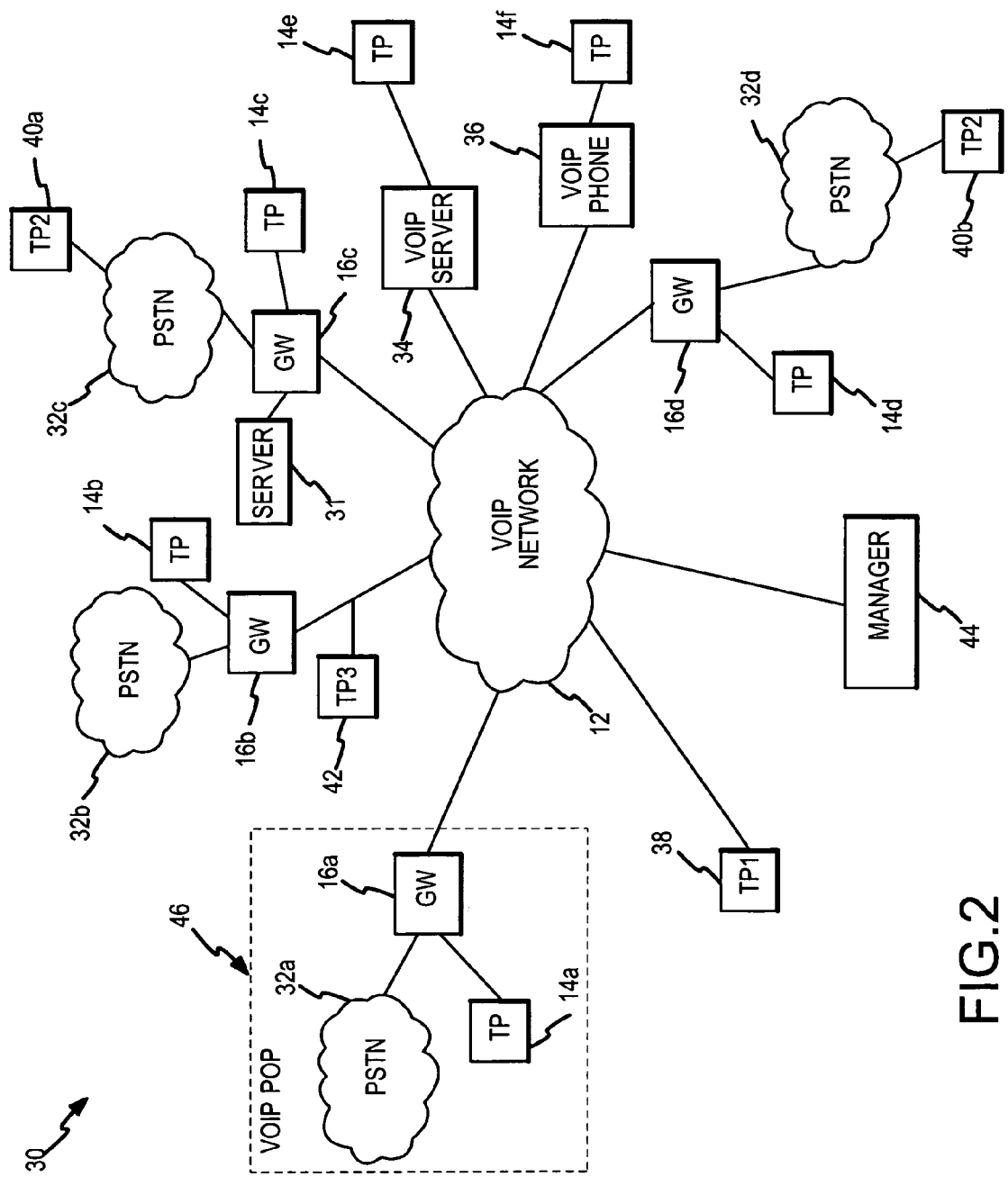
FIG. 2 is a block diagram of an exemplary VOIP-telephony network that employs the test topology of FIG. 1.

FIG. 2 depicts an exemplary telephony-VOIP network 30. The exemplary network 30 illustrates how the test topology of FiG. 1 is adapted for use in a production environment. The network 30 deploys a number of test probes like the test probes 14 (FIG. 1), indicated by reference numerals 14a through 14f, at different points along the border of the VOIP network 12. Although not shown in the figure, each of the test probes is configured with a copy of a reference voice file, as described earlier with reference to the reference voice files 22 of FIG. 1. Each of test probes 14a through 14d is connected to a respective one of gateways 16a through 16d. Also connected to the gateway 16c is a server 31. Each of the gateways 16a through 16d is connected to the VOIP network 12 and a respective on of PSTNs 32a through 32d.

In addition to the gateways 16, VOIP communications devices include a VOIP server 34 and a VOIP telephone 36. Each of the test probes 14 is controlled to generate test calls to others of the test probes 14 over the VOIP network 12, perform PAMS testing on the voice files played back in response to the test calls, as well as play a reference voice file when acting as a recipient of a test call, much in the same manner as was described for the two test probes shown in FIG. 1.

The test probes 14 attach to VOIP communications devices, such as devices 16, 34 and 36, through digital or analog circuits. In addition, or alternatively, test probes can be deployed at other locations for different types of voice quality (and possibly packet-based) test coverage. For example, active test probes can connect to PSTNs through telephony interfaces for end-to-end voice quality testing, like test probes (TP2) 40a, 40b, which are connected to PSTNS 32c and 32d, respectively, or can connect directly to the VOIP network 12 through an IP interface and appear to the VOIP network 12 as another gateway, or some other VOIP communications device. The latter configuration, an example of which is illustrated by test probe TP1 38, only tests the VOIP network, not the gateway, however. A "passive" test probe may be connected between the gateways 16 (or other VOIP communications devices) and the VOIP network 12 to produce information for all of the voice calls it sees, in particular, packet-based and voice quality information for all of the voice calls and PAMS data for probe-generated voice calls. Test probe (TP3) 42, which is coupled between the gateway 16b and the VOIP network 12, is an example of a passive test probe.

All of the test probes store a copy of the same reference voice file and have the capability to generate PAMS scores for test call traffic, All but passive test probes can generate and answer test calls in the manner described above. Unlike the other probes, the passive probe TP3 42 sees all voice calls, including test calls. It is able to identify a test call by a caller's IP address or the called phone number. Once a test call is detected, the passive probe can extract the audio from a test call and apply a PAMS test to it. Consequently, the passive probe provides a test result for a network location intermediate to the call source and destination points. A combination of end-to-end scores, border-to-end (or border) scores, as well as a passive probe scores, therefore enables a test administrator to isolate a network trouble spot.

In addition to PAMS testing, the end-to-end voice quality testing test probes 40 also include software to support other active test measurements for signaling and voice quality, including: post dialing delay; post gateway answer delay; background noise; audio level; insertion loss; round trip delay; echo and DTMF integrity.

The VOIP communications device test probes, such as test probe 38, can perform, in addition to the PAMS tests, the following signaling and voice quality tests: Q.931 setup time; RTP setup time; background noise; audio level; and insertion loss. The software can also simulate various packet-based impairments (e.g., jitter, total packet loss, packet loss burst, etc.) and assess their effects on the VOIP and the VOIP communications devices, e.g., the VOIP gateways 16. The voice quality measurements by the VOIP communications device test probes can be end-to-edge or edge-to-edge.

In addition to performing voice quality tests on PAMS-generated traffic, passive test probes, such as the test probe 42 can support, for all live traffic monitored on the VOIP network 12, the following active test measurements: call statistics; setup time; jitter per RTP stream; and packet loss (and packet loss burst) per RTP stream.

Thus, the deployment of the various types of probes throughout a network such as network 30 provides for a network-wide monitoring system. The different types of test probes, that is, the test probes 14, 38, 40 and 42, and the manager 44 shown in FIG. 2 may be implemented using commercially available hardware and software, for example, using the various components of the Omni-Q Voice Quality Management System manufactured by and available from RADCOM.

Still referring to FIG. 2, also connected to the VOIP network 12 is a management server (or manager) 44. All test probes in the network 30 are configured and controlled by the manager 44. The manager configures the test probe properties and test call generation schedules, as well as establishes alarms or thresholds to ensure delivery of service in accordance with Service Level Agreements (SLAs). It polls the probes on a periodic basis to gather test results, consolidates the test results for the entire network and stores the consolidated information in a database for analysis, reporting and historical trending.

In one exemplary commercial setting, the VOIP network infrastructure of the network 30 is maintained by a VOIP network operator (or wholesale service provider) and made available to that VOIP network operator's customers, e.g., retail service providers who use the infrastructure and related services of the VOIP network operator to provide services to end-users. The network operator manages the VOIP network infrastructure and related services using the manager 44. In a large-scale operation, the network operator supports a large number of VOIP Points of Presence (VOIP POPs), an example of which is indicated in dashed lines as VOIP POP 46, in different geographic regions for coverage of a larger territory, e.g., national level coverage. Each VOIP POP provides a point of entry to and termination from the VOIP network backbone. The network operator supports outbound call completion to the PSTNs for calls placed over the VOIP network and inbound call delivery for calls initiated on the PSTN for delivery over the VOIP network. An example of such an inbound service may be delivery of calls from end-users to a customer's unified messaging server. To support such a service, the network operator provides a block of local Direct Inward Dial (DID) numbers to the customer so the customer has local access capability in a particular geographic market. A call from an end-user to one of the DID numbers results in a call passing through a gateway associated with that number to the customer's server (via a gateway hosting that customer). Examples of other inbound call services include, for example, conference call bridging, call delivery to call centers and call waiting servers. The network operator provides service level agreements based on voice call quality, which includes voice call listening quality metrics (i.e., test score values) as well as packet-based metrics, as described above.

Figure 3:
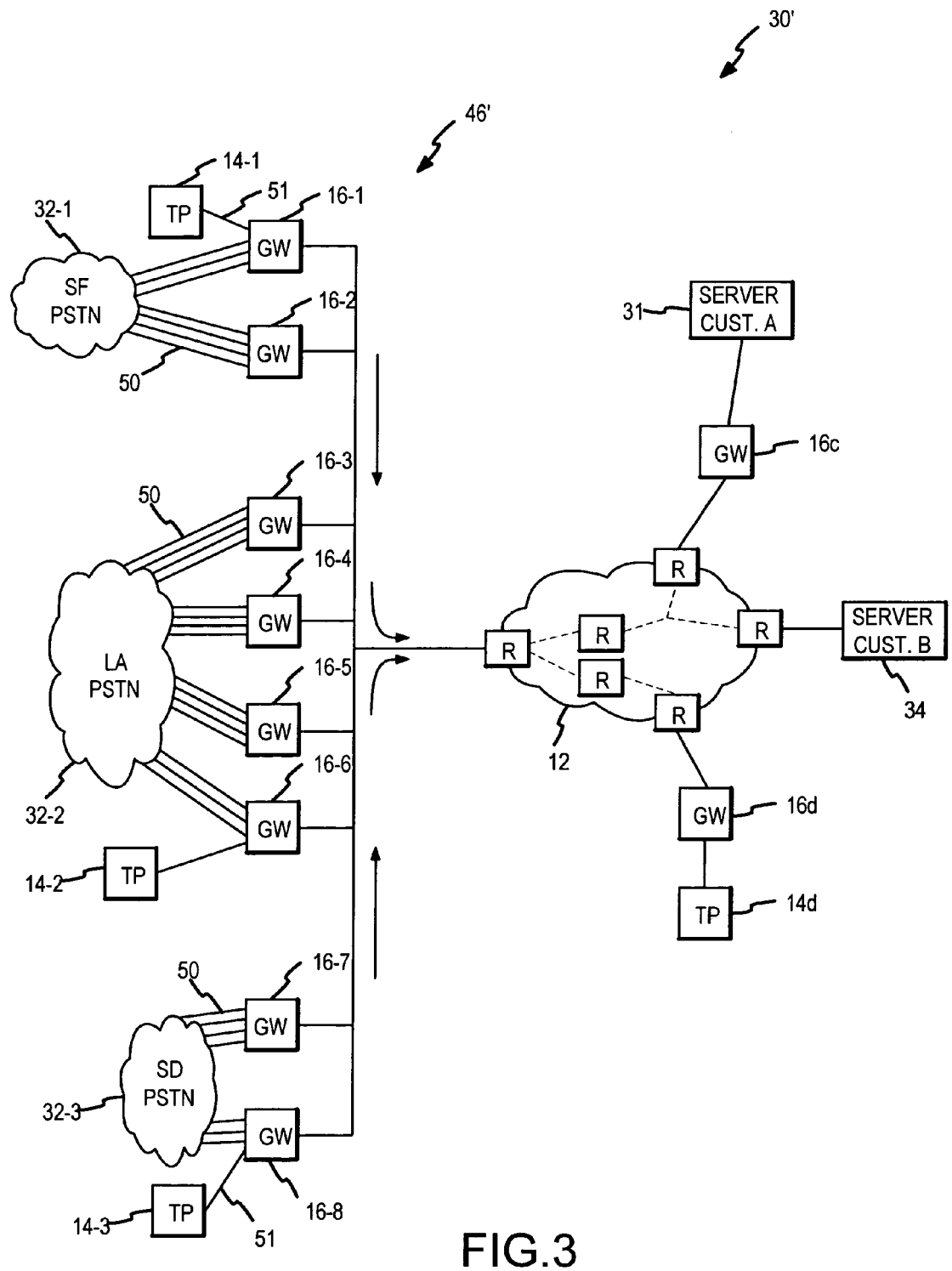
FIG. 3 is a detailed illustration of an exemplary VOIP Point of Presence (POP).

Referring to FIG. 3, a network 30' having an exemplary VOIP POP 46' that supports inbound service delivery and service level based voice call quality testing is shown in detail. In this example, the VOIP POP 46' includes multiple gateways 16-1, 16-2, . . . 16-8 to support different metropolitan areas, including San Francisco, Los Angeles and San Diego (as shown). The closest Internet access point is located in Los Angeles, so traffic from San Francisco and San Diego is directed to Los Angeles, where it is passed to an Internet backbone router 50. Each gateway 16 in each metropolitan area has multiple connections 52 to support customer traffic and at least one gateway 16 in each area supports a single connection 54 for connecting to one of three test probes 14-1, 14-2 and 14-3. The connections 52 in each area connect a respective PSTN to that area's gateways 16. Thus, the two gateways in San Francisco, the gateways, 16-1 and 16-2, are connected to a PSTN in San Francisco (SF PSTN), 32-1, and the gateway 16-1 is also connected to the test probe 14-1. The four gateways in Los Angeles, the gateways, 16-3, 16-4, 16-5 and 16-6, are connected to a PSTN in LA (LA PSTN), 32-2, and the gateway 16-6 is also connected to the test probe 14-2. With respect to San Diego, the gateways 16-7 and 16-8 are connected to a PSTN in San Diego (SD PSTN), 32-2, and the gateway 16-8 is also connected to the test probe 14-3.

In the illustrated example, and as discussed above, the VOIP network operator enables customers to deploy their services on a national level without having to make an investment in network infrastructure. Blocks of local DID numbers are made available to customers for use by end-users. In this example, it is assumed that one of the San Francisco gateways 16-1, 16-2 is configured to handle phone numbers having an area code "408" and a three-digit exchange of "123", followed by a four-digit number in the range of 1000–3000. Two customers, customers A and B, wish to service users in the San Francisco area and thus require blocks of local DIDs to give to customers in that area. The identified gateway therefore serves as a central office and all the inbound traffic is aggregated to a single connection point.

Figure 4:
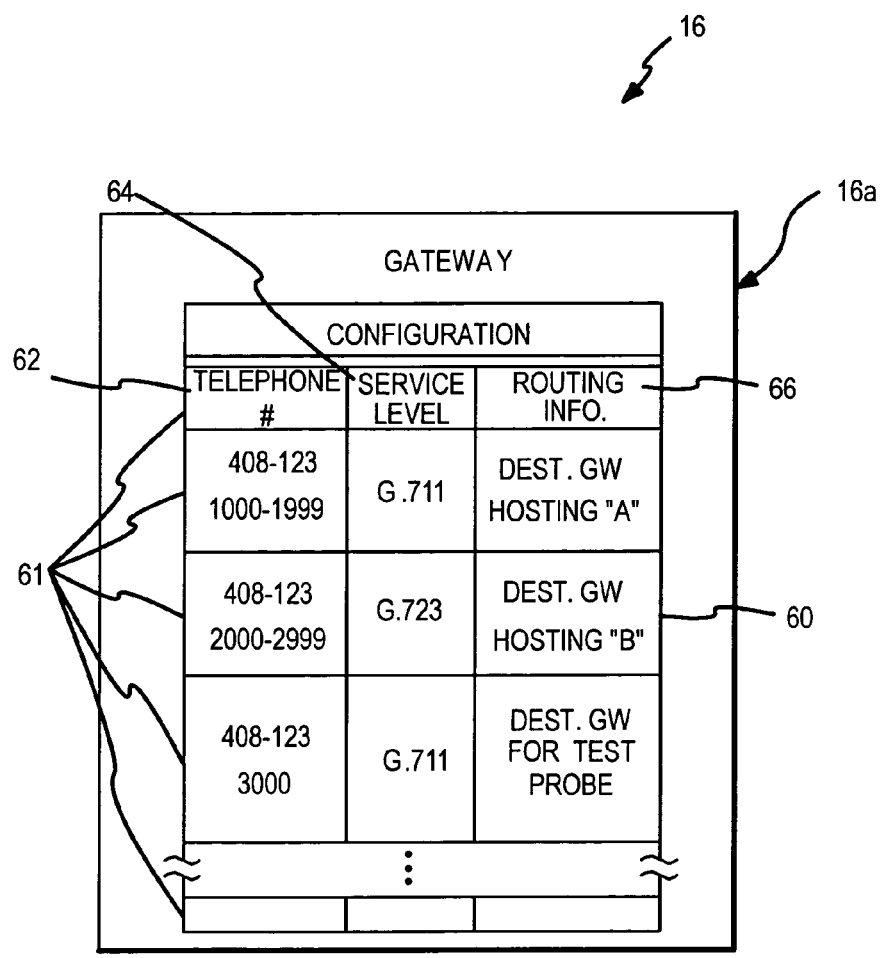
FIG. 4 is an illustration of a VOIP gateway configuration supporting voice call listening quality testing for a VOIP network.

In general, and referring to FIG. 4, the gateways 16 maintain a configuration table 60 that includes, for each of a plurality of profiles 61, a phone number 62, an associated service level 64 and routing information 66. At minimum, the service level 64 indicates the coding scheme to be used by the VOIP communications devices responsible for establishing the IP data path over which the voice transmission is to occur. The routing information 66 identifies by IP address a hosting gateway or server to which inbound traffic associated with the phone number 62 is to be directed.

As an example, and thus intended for illustrative purposes only, the second, third and fourth table entries are populated with data to support configurations for inbound VOIP calls for the two customers, customer "A" and customer "B", and SF test probe 14-1 via one of the gateways 16-1, 16-2 (FIG. 3). Numbers in the 1000–1999 range are allocated to customer A, who has requested G.711 service. The numbers in the range of 2000–2999 are allocated to customer B, who has requested G.723 service. The "3000" number is assigned to the test probe 14-1 for a specific service level, for example, G.711.

Referring to FIGS. 3 and 4, when one of the San Francisco gateways, say, 16-1, configured with the configuration data shown in the configuration 60, detects an in-coming call from the PSTN 32-1, it parses the configuration 60 to match the incoming phone number to any of the stored phone numbers. If the gateway 16-1 determines that the dialed number belongs to a particular customer such as customer A, it selects as a service level the service level requested by customer A, that is, the G.711 service level (specified by the service level field 64). It routes the call to the gateway identified by the routing information field 66 for hosting customer A, for example, the gateway 16c (shown coupled to the server 31, representing customer A), using the G.711 service level. A call belonging to customer B is handled in much the same way, but according to the specific configuration information for customer B. That is, the call is routed to a hosting gateway or a server for customer B, shown in the figure as the server 34, using the G.723 service. If the dialed number is 408-123-3000, the gateway 16-1 determines from the configuration 60 that the call is a test call to be placed to a test probe, for example, the test probe 14*d*, using G.711 service. At this point, the process is as described above with reference to FIG. 1.

As already indicated, the manager 44 is operated by the IP services provider to control the test probes deployed throughout the VOIP network 12. The manager 44 determines the frequency with which the test probes make test calls and schedules the test probes to generate and receive the test calls. It polls the test probes for test results (MOS scores) and is able to process the raw data for reporting, network repair/enhancements, and so forth. For example, the manager 44 can determine an average score from all of the test calls for each service level, that is, G.711, G.723 and G.729, during a given time period (e.g., on a monthly basis) and compare that average performance metric to a guarantee provided by an SLA between the VOIP network operator (service provider) and a service subscriber (such as the hypothetical customers A and B in the above-described example).

Other embodiments of the voice quality testing topology and VOIP-telephony network of FIGS. 1 and 2, respectively, are contemplated. For example, and referring to FIG. 5, a voice quality test network topology 70 includes the VOIP network 12 and coupled to the VOIP network 12 are a test probe 72 and a VOIP communications device 74. The test probe includes a reference voice file 76*a* and the VOIP communications device 74 has an embedded reference voice file 76*b*. The test probe 72 can be functionally identical to the test probe 38 shown in FIG. 2. The test probe 72 and the VOIP communications device 76 each include a suitable interface to allow direct connection to the VOIP network 12 over an appropriate VOIP network connection 80, e.g., an Ethernet connection. Thus, in contrast to the topology shown in FIG. 1, the topology 70 eliminates a second test by providing a voice file in a VOIP communications device having a codec to be evaluated. The VOIP communications device 76 can be any VOIP communications device that performs speech encoding/decoding in a particular VOIP network environment, for example, a gateway, a server, a telephone (like the gateway 16, VOIP server 34 and VOIP telephone, respectively, from FIG. 2), or any other VOIP communications device.

In addition to the voice file 76, the VOIP communications device must also have a voice quality test support module 82 to enable the device to answer a test call by playing the voice file. As indicated in the figure, the module 82 can be implemented as an Interactive Voice Response (IVR) unit as is well known in the art. At present, many VOIP communications devices already include an IVR unit to support other functions, such as interactive call processing functions. In those instances, the voice call listening quality test scheme is able to exploit a device's inherent interactive voice response (IVR) capability. Alternatively, if the device does not include IVR functionality, then the device requires a script enabling that device to recognize a special phone number and understand that a call to that special phone number is to be answered by playing the embedded voice sample file.

Figure 5:
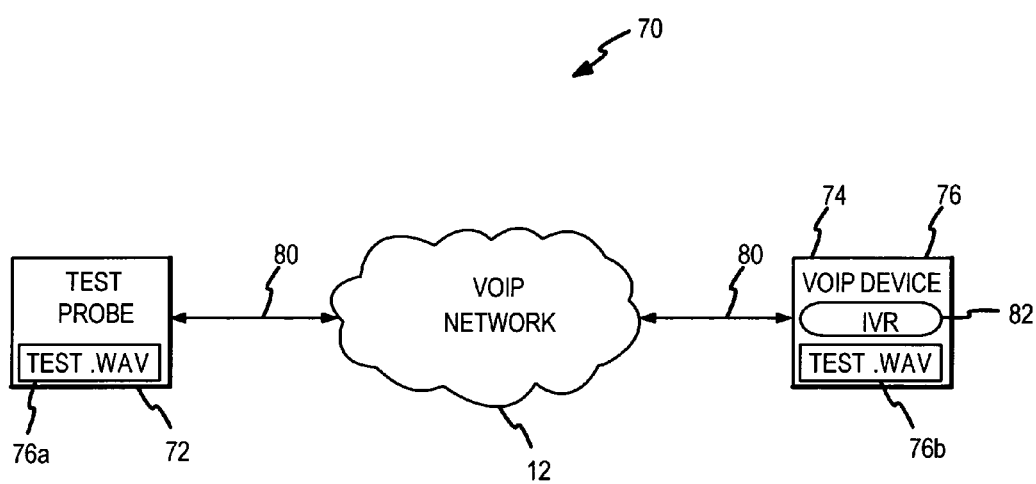
FIG. 5 is an alternative embodiment of the test topology of FIG. 1.
Figure 6:
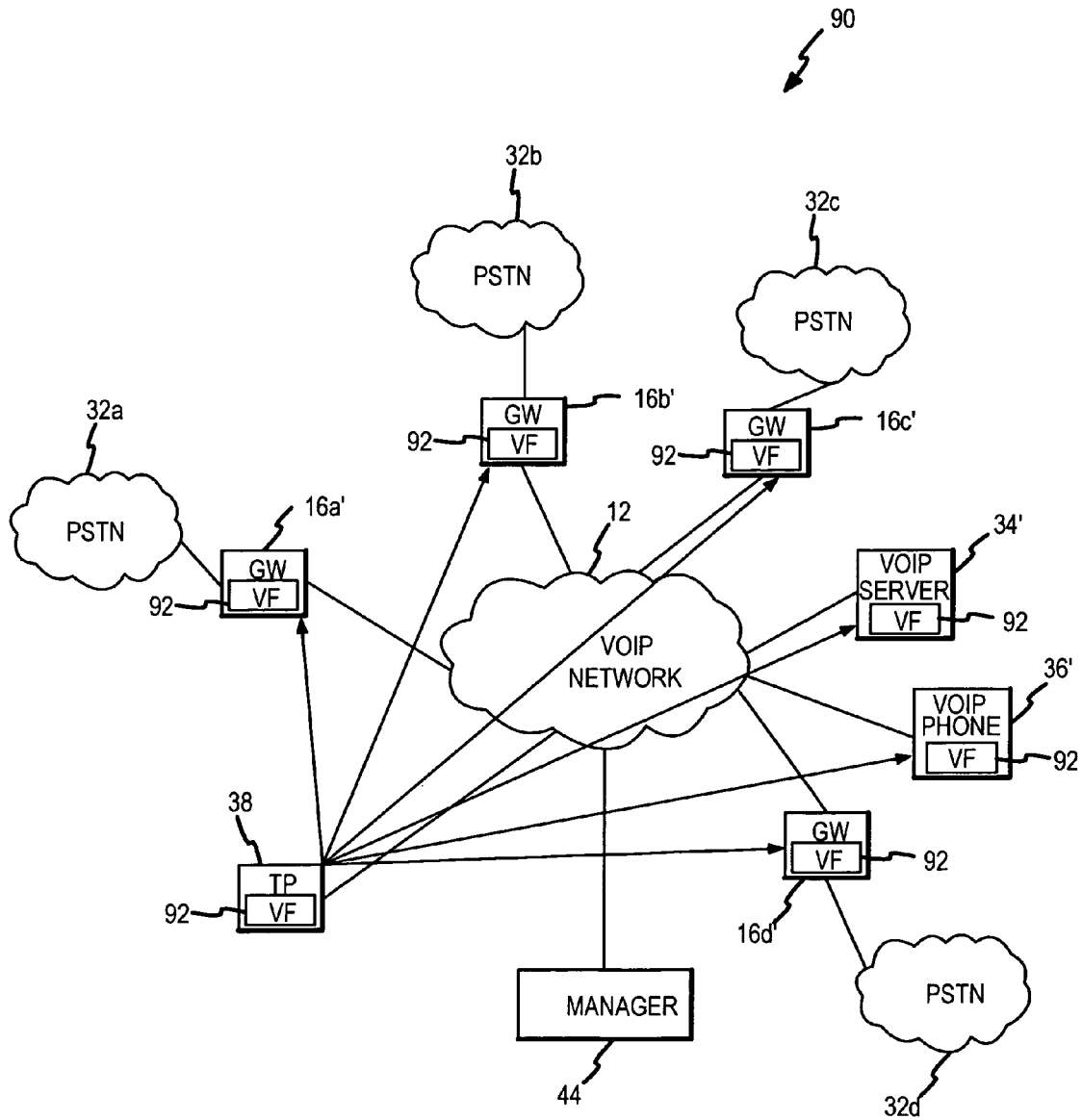
FIG. 6 is a VOIP-telephony network that employs the test topology of FIG. 5.

FIG. 6 illustrates an alternative VOIP-telephony network 90 generally configured in a similar configuration to that of the network 30 of FIG. 2, but modified so as to require only one test probe to produce PAMS scores for the voice call quality between the test probe and various connection points around the VOIP network 12 according to the test topology 70 shown in FIG. 5. That is, and with reference to FIGS. 2 and 6, the test probes 14 are eliminated by embedding voice files (VF) 92 in the VOIP communications devices to which the test probes 14 were coupled, that is, the gateways 16, VOIP server 34 and VOIP phone 36, shown with the embedded voice files in FIG. 6 as gateways 16', VOIP server 34' and VOIP phone 36'. The test probe 38 is responsible for generating calls to the gateways 16*a'*, 16*b'*, 16*c'* and 16*d'*, as well as device 34' and 36' (on a scheduled basis under the control of the manager 44) and generating PAMS scores from the responses (that is, the playback of stored reference voice files) by the called devices 16', 34' and 36'. The functionality of the manager 44 is as earlier described with respect to FIG. 2.

Additions, subtractions, and other modifications of the described embodiments of the invention will be apparent to those practiced in this field and are within the scope of the following claims. The test scheme and topology can be adapted to accommodate other different physical and signaling protocols. For example, the test probe 40 could be connected to an SS7 network, or the test probe 14 could connect to an SS7 or CAS gateway interface. Moreover, the packet-based network 12 need not be an IP network. The network 12 could be implemented as a Voice Over Frame Relay or Voice Over ATM network, and the interfaces and protocols supported by the test scheme could be modified accordingly.

What is claimed is:

1. A method of providing service for use in a Voice Over Internet Protocol (VOIP) network environment comprising:
   programmatically initiating VOIP test calls from a test probe (TP) having one or more addresses, the TP being associated with one or more service levels, each service level based on a type of internet protocol (IP) signaling protocol and a type of voice codec;
   selecting a service level of the plurality of service levels prior to initiating the VOIP test calls; and
   measuring voice call listening quality according to the selected service level for voice calls transmitted across a VOIP network to produce voice call listening quality metric values.

2. The method of claim 1, wherein each of the one or more addresses is associated with a different service level.

3. The method of claim 1, wherein the type of voice codec comprises a waveform codec.

4. The method of claim 1, wherein said measuring comprises measuring the voice call listening quality using a perceptual test model.

5. The method of claim 4, wherein the perceptual test model comprises Perceptual Analysis Measurement System (PAMS).

6. The method of claim 4, wherein the perceptual test model comprises Perceptual Speech Quality Measurement (PSQM).

7. The method of claim 1, wherein the type of voice codec comprises a hybrid codec.

8. The method of claim 1, wherein the voice call listening quality metric value corresponds in a Mean Opinion Score (MOS) value.

9. The method of claim 1, further comprising:
   using the measured voice call listening quality metric values to determine whether a service level agreement guarantee provided to a user of the VOIP network is met.

10. The method of claim 1, wherein measuring comprises: controlling test probes deployed along a border of the VOIP network to engage each other in test calls and to make voice call listening quality measurements based on the test calls.

11. The method of claim 10, wherein the test probes are connected to VOIP communication devices that are connected to the VOIP network.

12. The method of claim 11, wherein the VOIP communication devices comprise gateways.

13. The method of claim 1, wherein measuring comprises: controlling test probes deployed at edges of the VOIP network to engage each other in test calls and to make voice call listening quality measurements based on the test calls.

14. The method of claim 1, wherein measuring comprises: controlling at least one test probe deployed at and connected to a telephony network that is coupled to the VOIP network by a gateway to generate test voice calls and to make voice call listening quality measurements based on the generated test voice calls.

15. The method of claim 1, wherein the selected service level is further associated with a VOIP signaling protocol.

16. The method of claim 15, wherein the VOIP signaling protocol comprises H.323.

17. The method of claim 15, wherein the VOIP signaling protocol comprises Session Initiation Protocol (SIP).

18. The method of claim 15, wherein the VOIP signaling protocol comprises Media Gateway Control Protocol (MGCP).

19. A computer program product residing on a computer readable medium for providing service for use in a Voice Over Internet Protocol (VOIP) network environment, comprising instructions for causing a computer to:

associate a different service level of a plurality of service levels with each phone number of a plurality of phone numbers of a test probe, each service level corresponding to at least one combination of a type of internet (IP) signaling protocol and a type of voice codec; and responsive to a test voice call directed to one of the plurality of phone numbers, cause the test voice call to be transferred over the VOIP network to such phone number of the test probe at the associated service level and causing a voice call listening quality to be measured at the test probe for the associated service level to produce a voice call listening quality metric value.

* * * * *